Figure 1:
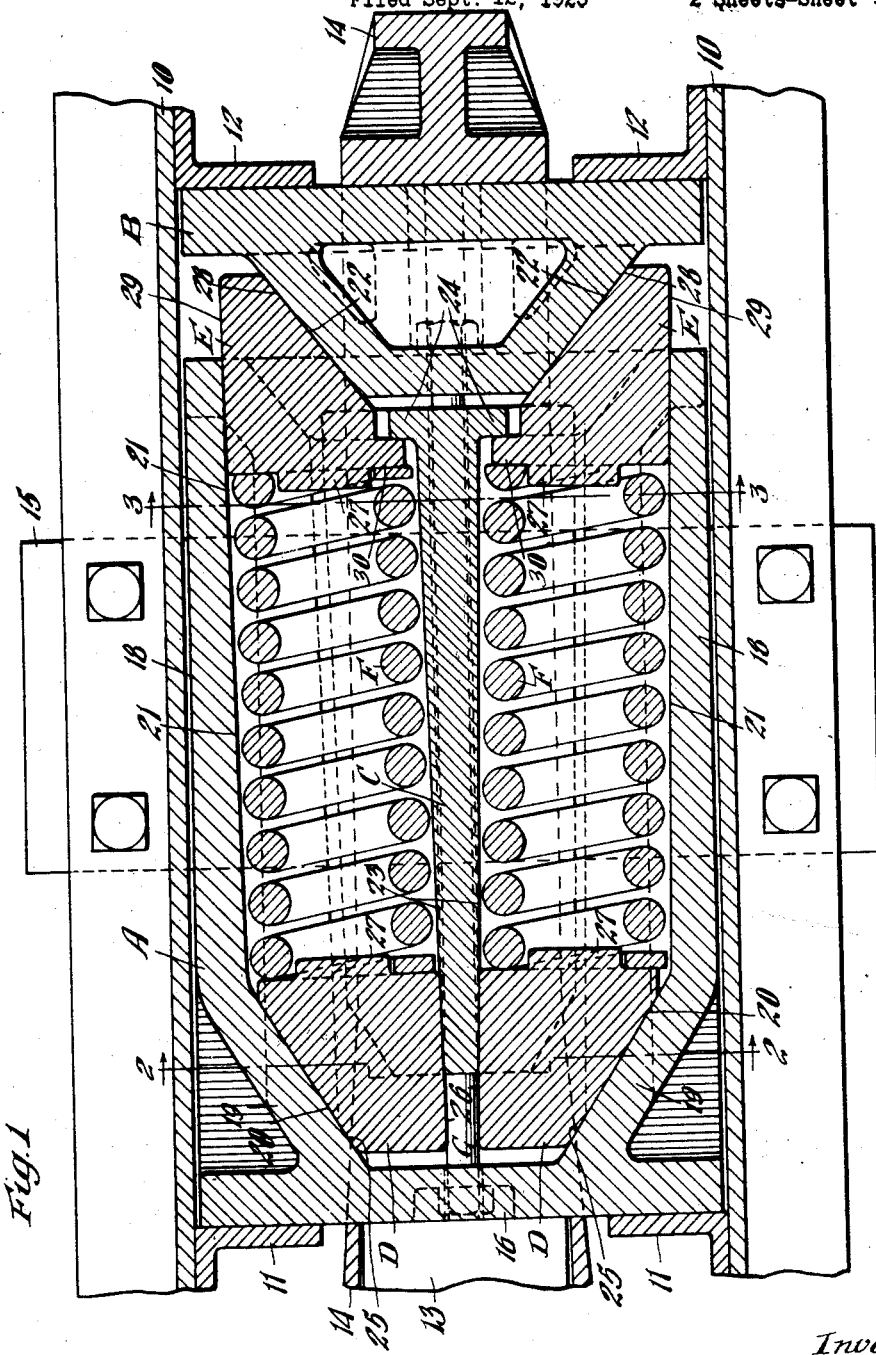

July 26, 1927.

S. B. HASELTINE 1,637,150

FRICTION SHOCK ABSORBING MECHANISM

Filed Sept. 12, 1925    2 Sheets-Sheet 1

Witness
Wm. Geiger

Inventor
Stacy B Haseltine
By George I Haight
His Atty.

July 26, 1927.
S. B. HASELTINE
1,637,150
FRICTION SHOCK ABSORBING MECHANISM
Filed Sept. 12, 1925  2 Sheets-Sheet 2
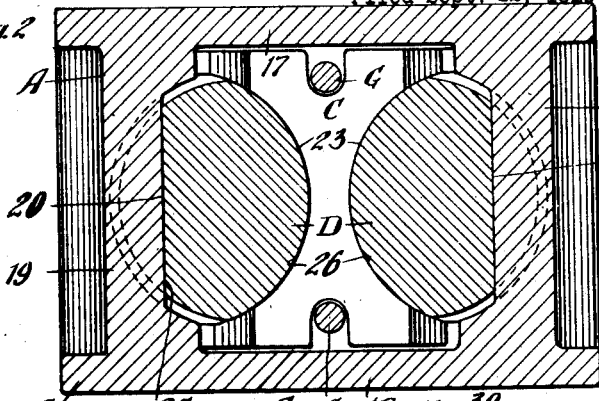
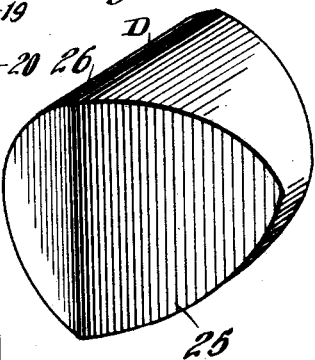
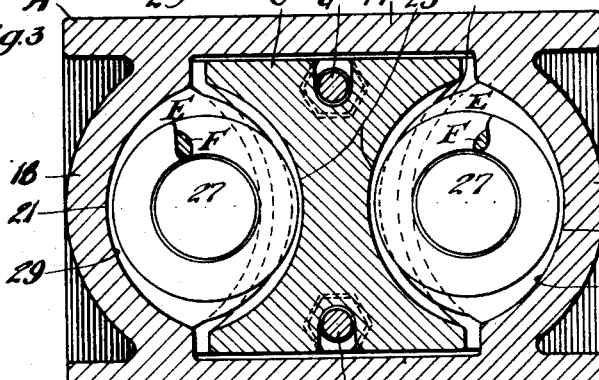
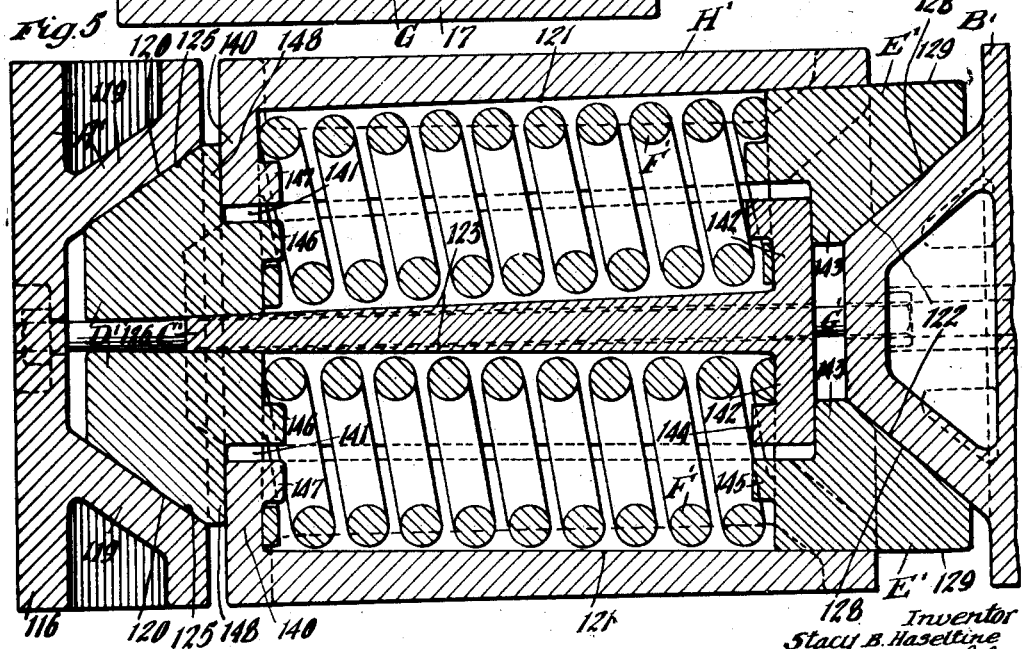
Inventor
Stacy B. Haseltine
By George I. Haight
Atty.
Witness
Wm. Giger Patented July 26, 1927.

1,637,150

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed September 12, 1925. Serial No. 55,917.

This invention relates to improvements in friction shock absorbing mechanisms.

One object of the invention is to provide a friction shock absorbing mechanism of high capacity, including a plurality of relatively movable friction elements having co-operating friction surfaces, wherein the areas of frictional contact are relatively great.

Another object of the invention is to provide a friction shock absorbing mechanism, especially adapted for railway draft riggings, including a plurality of relatively movable friction elements having co-operating friction surfaces wherein a light preliminary action is had, followed by a relatively high resistance during the remainder of the compression stroke.

A further object of the invention is to provide a mechanism of the character indicated, including a friction shell and main follower which are relatively movable, a central friction element and a plurality of shoes adapted to be pressed into tight frictional contact respectively with the shell and friction element and slide thereon during compression of the mechanism to produce relatively high resistance.

Other objects and advantages of the invention will more fully and clearly appear from the description and claims hereinafter following.

In the drawings, forming a part of this specification, Figure 1 is a longitudinal, horizontal, sectional view of a portion of a railway draft rigging, showing my improvements in connection therewith. Figures 2 and 3 are transverse, vertical, sectional views corresponding respectively to the lines 2—2 and 3—3 of Figure 1. Figure 4 is a detailed, perspective view of a friction shoe used in connection with my improved mechanism. And Figure 5 is a view similar to Figure 1, showing a different embodiment of the invention.

In said drawings, referring first to the embodiment of the invention illustrated in Figures 1 to 4, inclusive, 10—10 indicate channel-shaped center or draft sills of a railway car underframe, to the inner faces of which are secured front stop lugs 11—11 and rear stop lugs 12—12. The inner end portion of the drawbar is designated by 13, to which is operatively connected a hooded cast yoke 14 of well-known form. The shock absorbing mechanism proper is disposed within the yoke. The yoke and the parts therewithin are operatively supported by a detachable saddle plate 15 suitably secured to the draft sills.

The improved shock absorbing mechanism proper illustrated in Figures 1 to 4, inclusive, comprises broadly a combined front follower and friction shell A; a rear follower B; a friction post C; a pair of front friction shoes D—D; a pair of rear friction shoes E—E; twin arranged main spring resistance elements F—F; and a pair of retainer bolts G—G.

The combined front follower and friction shell A is of substantially rectangular box-like form having a transverse front end wall 16, spaced, horizontally disposed, top and bottom walls 17—17, vertically disposed, longitudinally extending, spaced side walls 18—18, and short, inclined side walls 19—19 at the forward end thereof connecting the longitudinal walls to the end wall 16. The transverse end wall 16 co-operates with the stop lugs 11 in the manner of the usual front follower. The inclined side walls 19 present interior wedge faces 20—20, the faces 20 being opposed and diverging rearwardly of the mechanism. The longitudinal side walls 18 proper have true cylindrical friction surfaces 21 on the inner sides thereof, the friction surfaces 21 preferably diverging slightly rearwardly of the mechanism, as shown.

The rear follower B is in the form of a relatively heavy rectangular plate having a hollow projection on the inner side thereof provided with inwardly converging wedge faces 22—22 on its opposite sides. The follower B co-acts wtih the stop lugs 12—12 in the usual manner.

The friction post C is longitudinally disposed and has a pair of friction surfaces 23—23 on the opposite sides thereof. The friction surfaces 23 are preferably of true cylindrical contour and converge forwardly of the mechanism. At the rear end, the post is provided with a pair of ribs 24—24 at opposite sides thereof adapted to co-operate with the rear set of friction shoes E to be restored thereby to normal position. At the rear end, the post also has a flat transverse face adapted to co-operate with a flat, transverse face on the front end of the enlargement of the rear follower. As most clearly shown in Figure 1, the rear end of the post is normally spaced a slight distance from the front end of the follower B to provide a limited amount of relative movement during preliminary compression of the mechanism.

The friction shoes D which are preferably two in number, are disposed at opposite sides of the friction post C at the forward end thereof. Each of the friction shoes D, as most clearly illustrated in Figures 1 and 4, has a flat outer wedge face 25 correspondingly inclined to and adapted to co-operate with one of the wedge faces 20 of the friction shell A. On the opposite side of the shoe to that having the wedge face 25, each shoe is provided with a true cylindrical friction surface 26 adapted to co-operate with the friction surface 23 at the corresponding side of the post C. At the inner end, each shoe has a flat transverse end face adapted to co-operate with the corresponding spring resistance element F, the face being provided with a central boss 27 adapted to extend into the coil of the spring to hold the same properly centered.

Each shoe D is cut away on the side carrying the wedge face 25, as most clearly shown in Figure 4, to properly clear the corresponding friction surface of the shell. The friction shoes E which are also preferably two in number, are disposed at opposite sides of the post at the rear end thereof. Each shoe E is provided with an inner flat wedge face 28 correspondingly inclined to and adapted to co-operate with the wedge face 22 at the corresponding side of the follower B. Each shoe E is also provided with an outer, longitudinally extending, true cylindrical friction surface 29 adapted to co-operate with the friction surfaces 21 at the corresponding side of the friction shell A. At the inner end, each shoe has a flat face adapted to bear on the corresponding end of one of the spring resistance elements F, each shoe being also provided with a boss 27 similar to the boss hereinbefore described in connection with the shoes D and serving to center the spring. On the side carrying the wedge face 28, each shoe has a lateral projection 30 adapted to co-operate with the rib 24 at the corresponding side of the friction post to limit the outward movement of the post. The shoes E are cut away on curved lines on the sides carrying the wedges faces in a manner similar to the shoes D, to provide clearance between the shoes and the friction surfaces of the post.

The twin arranged spring resistance elements F are disposed at opposite sides of the post, each member thereof comprising a single relatively heavy coil bearing on the inner ends of the corresponding shoes D and E, respectively.

The mechanism is held under initial compression and of uniform, overall length by the retainer bolts G. The bolts G are preferably two in number and are disposed at the top and bottom of the mechanism, each bolt having one end thereof anchored to the follower B, and the other end anchored to the transverse wall 16 of the shell A, the latter being recessed to accommodate the nut of the bolt and the head being accommodated within the hollow portion of the enlargement of the rear follower B. The post C is longitudinally slotted at the top and bottom sides thereof as shown to accommodate the shanks of the bolts. The bolts are so adjusted when the mechanism is assembled that the main springs F are under a certain amount of initial compression. Compensation for wear of the various friction and wedge faces is had by the expansion of the springs F.

The operation of my improved shock absorbing mechanism, assuming a compression stroke, is as follows: The combined follower and friction shell A and follower B are moved relatively toward each other, thereby setting up a wedging action between the wedge faces of the follower A and the friction wedge shoes D, forcing the shoes into intimate frictional contact with the friction surface of the post. During this action, the shoes will also be forced rearwardly of the mechanism, compressing the spring resistance elements F and forcing the wedge friction shoes E rearwardly against the wedge faces of the follower B. Due to the wedging action between the follower B and the shoes E, the latter will be forced into intimate frictional contact with the friction surfaces of the shell. During the initial compression of the mechanism, the post C will be carried inwardly in unison with the friction shoes D, due to the friction existing between these parts. At this time, the friction shell will also be carried rearwardly with reference to the shoes E, thereby creating friction between the shoes and the shell. The movement in unison of the shoes D and the post C will continue until the clearance between the rear end of the post and the projection on the follower is taken up, whereupon further movement of the post will be arrested. During the remainder of the compression stroke, the friction shoes D will slide inwardly on the post. The described action will continue either until the actuating force is reduced or movement of the shell is limited by engagement with the follower B, and movement of the post is limited by engagement with the follower or casing A. When the actuating force is reduced, the springs F will force the shoes apart and restore the shell and post to normal position, the post being carried forwardly due to the friction existing between the same and the shoes D. Outward movement of the shell A with reference to the follower B will be limited by the retainer bolts G.

Referring next to the embodiment of the invention illustrated in Figure 5, the improved mechanism shown therein comprises a front follower A'; a rear follower B'; a friction post C'; a pair of front friction shoes D'—D'; a pair of rear friction shoes E'—E'; twin arranged spring resistance elements F'—F'; a pair of retainer bolts G'—G'; and a friction shell H'.

The front follower A' is in the form of a casing having the transverse end wall 116 adapted to co-operate with the front stop lugs on the draft sills and rearwardly diverging spaced side walls 119—119 having interior, opposed, rearwardly diverging wedge faces 120—120.

The friction shell H' is in the form of a substantially rectangular casting having side, top and bottom walls, and a front end wall 140 having a central opening 141 for a purpose hereinafter described. The side walls of the casing H' are provided with interior, longitudinally disposed friction surfaces 121 in all respects similar to the friction surfaces of the form of the invention hereinbefore described, and co-operating with friction surfaces 129 on the shoes E'.

The rear follower B' is in all respects similar to the follower B hereinbefore described, and has exterior wedge faces 122 on the opposite sides thereof co-operating with wedge faces 128 on the friction shoes E'.

The friction post C' is similar to the friction post C with the exception that it is provided with lateral flanges 142 at the rear end thereof in place of the ribs of the post C, the flanges 142 bearing on shoulders 143—143 at the inner ends of the friction shoes E'. Each of the flanges is also provided with a forward projection 144 at the extremity thereof, the projections 144 forming with projections 145 provided on each of the friction shoes E', bosses adapted to extend into the corresponding ends of the coils of the spring resistance elements F'.

The friction shoes D' are similar to the shoes D hereinbefore described, with the exception that they have extensions at their inner ends projecting into the recess 141 of the shell A'. The extensions are provided with projections 146 similar to the projections 144 described, and forming with projections 147 on the wall 140 of the shell H' bosses extending into the corresponding ends of the spring resistance elements F'. Another distinction is that the shoes D' are each provided with a shoulder 148 at the inner end thereof adapted to bear on the corresponding side of the end wall 140 of the shell. Each of the shoes D' is also provided with a cylindrical friction surface 126 adapted to co-operate with one of the friction surfaces 123 of the post and a wedge face 125 adapted to co-operate with one of the wedge faces 120 of the follower A'.

The spring resistance elements F' are twin arranged and disposed at opposite sides of the mechanism and interposed between the shoes D' and E' and also bear on the front end wall 140 of the friction shell and the lateral flanges 142 at the rear end of the friction post C'.

The retainer bolts G' are in all respects similar to the retainer bolts hereinbefore described and are similarly arranged.

In the normal position of the parts, the front wall 140 of the friction shell H' is spaced slightly from the inner end of the follower A', this clearance being provided to insure a wedging action being set up between the follower A' and the friction shoes D' without the follower coming into actual contact with the front end of the friction shell. The rear end of the post C' is also spaced a pre-determined distance from the front end of the projection on the follower B', as shown, to permit a certain amount of relative movement between these parts to compensate for wear.

The operation of the improved shock absorbing mechanism as shown in Figure 5, is as follows, assuming a compression stroke:— The followers A' and B' are moved relatively toward each other, thereby setting up a wedging action between the same and the shoes D' and F', respectively. At the same time, the shoes are forced longitudinally toward each other, slipping on the friction surfaces of the post and shell respectively. Inasmuch as the shoes D' directly engage the front end of the friction shell H', the latter will be moved rearwardly in unison therewith, and as the post bears on the front ends of the friction shoes E', there will be no relative movement longitudinally of the post with respect to these shoes during compression of the mechanism. The compression of the mechanism will continue either until the actuating force is reduced or the rear end of the friction shell H' engages the follower B', and the end of the friction post C' engages the follower A'.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with front and rear relatively movable follower acting elements, one of said elements having exterior wedge faces thereon and the other element being provided with interior wedge faces; of a friction shell adapted to move with one of said follower elements; a friction post relatively to which said last named follower element is movable; friction shoes having wedge faces, certain of said shoes having frictional engagement with said post and having the wedge faces thereof co-operating with the wedge faces of one of said follower elements, the remaining friction shoes having frictional engagement with the shell and having the wedge faces thereof co-operating with the wedge faces of the other follower element; and means for yieldingly resisting movement of the friction shoes.

2. In a friction shock absorbing mechanism, the combination with a pair of relatively movable followers, one of said followers forming a friction shell and having interior wedge faces and the other follower having a friction post movable therewith, said follower having exterior wedge faces; friction shoes having wedge faces, certain of said shoes frictionally engaging said shell and having the wedge faces thereof co-operating with the exterior wedge faces and others of said shoes having frictional engagement with the post and having the wedge faces thereof co-operating with said interior wedge faces; and spring resistance means interposed between said shoes.

3. In a friction shock absorbing mechanism, the combination with front and rear relatively movable follower elements, one of said elements having exterior wedge faces and a longitudinally disposed friction member movable therewith, and the other follower having interior wedge faces and a second longitudinally disposed friction member movable therewith; friction shoes having frictional engagement with each friction member, the shoes having frictional engagement with one of said members having wedge faces engaging the wedge faces of one of said followers and the shoes having frictional engagement with the other member having wedge faces engaging with the wedge faces of the other follower; and spring resistance means opposing relative movement of said shoes.

4. In a friction shock absorbing mechanism, the combination with front and rear relatively movable follower acting elements, one of said elements having exterior wedge faces thereon and the other follower being provided with interior wedge faces; of a friction member adapted to move with one of said follower elements; a second friction member relatively to which said last named follower is movable; friction shoes having wedge faces, certain of said shoes having frictional engagement with said first named member and having the wedge faces thereof engaging with the wedge faces of one of said follower elements, the remaining friction shoes having frictional engagement with said second named member and having the wedge faces thereof engaging with the wedge faces of the other follower element; and means for yieldingly resisting movement of said friction shoes.

5. In a friction shock absorbing mechanism, the combination with a follower having interior wedge faces and a friction shell thereon; of a second follower having exterior wedge faces, said followers being relatively movable toward and away from each other; a friction post, said post and first named follower being relatively movable; friction shoes co-operating with the post and having wedge faces co-operating with the wedge faces of said first named follower; friction shoes co-operating with the shell and having wedge faces engaging the wedge faces of said second named follower; and spring resistance means interposed between said first and second named shoes.

6. In a friction shock absorbing mechanism, the combination with a pair of relatively movable followers; of a friction shell on one of said followers; a friction post co-operating with the other follower and having limited movement relative thereto; friction shoes having frictional engagement respectively with said friction shell and post, the shoes having frictional engagement with the shell having wedging engagement with one of said followers and the shoes having frictional engagement with the post having wedging engagement with the other follower; and yielding means resisting relative movement of said shoes.

7. In a friction shock absorbing mechanism, the combination with a friction shell; of a follower, said shell and follower being relatively movable; a friction post relatively to which said shell is movable; a set of friction shoes co-operating with the post and having wedging engagement with the shell; a second set of friction shoes having frictional engagement with the shell and wedging engagement with the other follower; and a spring resistance for said shoes.

8. In a friction shock absorbing mechanism, the combination with a follower having wedge faces; of a friction shell carried by said follower; a second follower having wedge faces; a longitudinally disposed tapered friction element interposed between said followers; a plurality of friction shoes, certain of said shoes having wedging engagement with one of said followers and frictional engagement with the friction shell, and others of said shoes having wedging engagement with the other follower and frictional engagement with the friction element; and a spring resistance interposed between said shoes.

9. In a friction shock absorbing mechanism, the combination with a movable follower having wedging means movable therewith; of a friction shell having wedging means thereon, said shell and follower being relatively movable; a longitudinally disposed friction post; a pair of friction shoes co-operating with said post and having wedging engagement with the wedge means of said shell; a second pair of friction shoes having frictional engagement with the shell and wedging engagement with said follower; and spring resistance means between said two pairs of shoes.

10. In a friction shock absorbing mechanism, the combination with a friction shell having interior inwardly converging friction surfaces, said shell also having interior wedge faces; of a follower having exterior wedge faces, said shell and follower being relatively movable toward and away from each other; a friction post; a set of shoes frictionally engaging said post and having wedge faces co-operating with said shell wedge faces; a second set of shoes having frictional engagement with the friction surfaces of the shell and having wedge faces co-operating with said follower wedge faces; and means for yieldingly resisting relative movement of said sets of shoes.

11. In a friction shock absorbing mechanism, the combination with a friction shell having interior curved friction sufaces and interior wedge faces; of a follower having exterior wedge faces, said follower and shell being relatively movable; a friction post having longitudinally disposed curved friction surfaces; a plurality of shoes, certain of which have friction surfaces co-operating with said post friction surfaces and wedge faces co-operating with said shell wedge faces, and others of said shoes having friction surfaces engaging said shell friction surfaces and wedge faces co-operating with the wedge faces of the follower; and means for yieldingly resisting relative movement of the shoes.

12. In a friction shock absorbing mechanism, the combination with a pair of relatively movable followers, one of said followers having interior wedge faces and the other follower having exterior wedge faces; of a friction shell adapted to be moved by one of said followers; a friction post having limited movement with reference to the other follower to provide for preliminary action; a set of friction shoes having wedge faces engaging with the wedge faces of one of said followers and friction surfaces engaging with said post; a second set of friction shoes having frictional engagement with the shell and wedging engagement with the other follower; and yielding pressure transmitting means interposed between said two sets of friction shoes.

In witness that I claim the foregoing I have hereunto subscribed my name this 9th day of September, 1925.

STACY B. HASELTINE.